United States Patent
Figgatt et al.

(10) Patent No.: US 11,710,062 B2
(45) Date of Patent: *Jul. 25, 2023

(54) PARALLEL MULTI-QUBIT OPERATIONS ON A UNIVERSAL ION TRAP QUANTUM COMPUTER

(71) Applicants: University of Maryland, College Park, College Park, MD (US); IonQ, Inc., College Park, MD (US)

(72) Inventors: Caroline Figgatt, Denver, CO (US); Aaron Ostrander, Woodstock, GA (US); Norbert M. Linke, Stevenson, MD (US); Kevin A. Landsman, Rockville, MD (US); Daiwei Zhu, College Park, MD (US); Dmitri Maslov, Falls Church, VA (US); Christopher Monroe, Columbia, MD (US)

(73) Assignees: UNIVERSITY OF MARYLAND, COLLEGE PARK, College Park, MD (US); IONQ, INC., College Park, MD (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/448,652

(22) Filed: Sep. 23, 2021

(65) Prior Publication Data

US 2022/0083889 A1 Mar. 17, 2022

Related U.S. Application Data

(63) Continuation of application No. 16/433,950, filed on Jun. 6, 2019, now Pat. No. 11,157,826.

(Continued)

(51) Int. Cl.
*G06N 10/00* (2022.01)
*G06F 7/501* (2006.01)

(52) U.S. Cl.
CPC ............ *G06N 10/00* (2019.01); *G06F 7/501* (2013.01)

(58) Field of Classification Search
CPC ................................ G06N 10/00; G06F 7/501
(Continued)

(56) References Cited

U.S. PATENT DOCUMENTS

| 9,858,531 B1 | 1/2018 | Monroe |
| 2007/0252081 A1 | 11/2007 | Munro |
| 2021/0142204 A1 | 5/2021 | Hendrickson |

OTHER PUBLICATIONS

International Search Report and Written Opinion corresponding to International Application No. PCT/US2019/036072, dated Sep. 16, 2019.

(Continued)

*Primary Examiner* — Tan V Mai
(74) *Attorney, Agent, or Firm* — ArentFox Schiff LLP

(57) ABSTRACT

The disclosure describes various aspects related to enabling effective multi-qubit operations, and more specifically, to techniques for enabling parallel multi-qubit operations on a universal ion trap quantum computer. In an aspect, a method of performing quantum operations in an ion trap quantum computer or trapped-ion quantum system includes implementing at least two parallel gates of a quantum circuit, each of the at least two parallel gates is a multi-qubit gate, each of the at least two parallel gates is implemented using a different set of ions of a plurality of ions in a ion trap, and the plurality of ions includes four or more ions. The method further includes simultaneously performing operations on the at least two parallel gates as part of the quantum operations. A trapped-ion quantum system and a computer-readable storage medium corresponding to the method described above are also disclosed.

20 Claims, 12 Drawing Sheets

Related U.S. Application Data

(60) Provisional application No. 62/682,677, filed on Jun. 8, 2018.

(58) Field of Classification Search
USPC .......................................................... 706/62
See application file for complete search history.

(56) References Cited

OTHER PUBLICATIONS

Figgat, Caroline, "Abstract Submitted for the DAMOP18 Meeting of The American Physical Society: Parallel 2-Qubit Operations on a Programmable Ion Trap Quantum Computer", Bulltetin of the American Physical Society, [URL: http://meetings.aps.org/Meeting/DAMOP18/Session/H09], Jan. 1, 2018.

Lekitsch, Bjoern, et al., "Blueprint for a microwave trapped ion quantum computer", Science Advances, vol. 3. No. 2, Feb. 1, 2017, pp. 1 to 11.

Weidt, S., et al., "Trapped-Ion Quantum Logic with Global Radiation Fields", American Physical Society, Physical Review Letters, vol. 117, No. 22, Nov. 25, 2016.

Maslov, Dmitri, "Basic circuit compilation techniques for an ion-trap quantum machine", ARIX.org [URL: https://arxiv.org/pdf/1603.07678.pdf], Feb. 21, 2017, pp. 1-18.

Unknown: "Session H09: Quantum Gates", Bulletin of the American Physical Society, [URL: https://web.archive.org//web/20180511143037/http://meetings.aps.org/Meeting/DAMOP18/Session/H09], May 11, 2018.

International Preliminary Report on Patentability for PCT/US2019/036072, dated Sep. 18, 2020, 8 pages.

PARALLEL MULTI-QUBIT OPERATIONS ON A UNIVERSAL ION TRAP QUANTUM COMPUTER

CROSS REFERENCE TO RELATED APPLICATIONS

The present application is a continuation of U.S. patent application Ser. No. 16/433,950, entitled "PARALLEL MULTI-QUBIT OPERATIONS ON A UNIVERSAL ION TRAP QUANTUM COMPUTER," and filed on Jun. 6, 2019, which claims priority to and the benefit of U.S. Provisional Patent Application No. 62/682,677, entitled "PARALLEL 2-QUBIT OPERATIONS ON A UNIVERSAL ION TRAP QUANTUM COMPUTER," and filed on Jun. 8, 2018, the contents of which are incorporated herein by reference in their entirety.

GOVERNMENT LICENSE RIGHTS

This invention was made with government support under PHY0822671 awarded by NSF, W911NF1610082 awarded by IARPA, W911NF1610349 awarded by ARO, and FA95501410052 awarded by AFOSR. The government has certain rights in the invention.

BACKGROUND OF THE DISCLOSURE

Aspects of the present disclosure generally relate to enabling effective multi-qubit operations, and more specifically, to techniques for enabling parallel multi-qubit operations on a universal ion trap quantum computer.

A circuit model of a quantum computer consists of sequences of gate operations between quantum bits (qubits), drawn from a universal family of discrete operations, and the capability to perform these gates in parallel is crucial for advances in quantum computing technology. The ability to execute simultaneous or parallel quantum gates offers clear efficiency gains for numerous quantum circuits and algorithms. More importantly, quantum gate parallelism is essential for the fault-tolerant error correction of qubits that suffer from idle decoherence. Without gate parallelism, the required error threshold for fault-tolerance may become inaccessibly small for realistic systems. The implementation of parallel quantum gates is complicated by potential crosstalk, especially between qubits fully connected by a common-mode bus, such as in Coulomb-coupled trapped atomic ions or cavity-coupled superconducting transmons.

Accordingly, it is desirable to enable techniques that allow quantum gate parallelism and avoids some of the existing limitations, particularly as it relates to trapped ion technology.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

This disclosure presents various aspects related to multi-qubit operations, and more specifically, to techniques for enabling parallel multi-qubit (at least two-qubit) operations on a universal ion trap quantum computer. This disclosure describes a method of performing quantum operations in a trapped-ion quantum system that includes implementing at least two parallel gates of a quantum circuit, each of the at least two parallel gates is a multi-qubit gate, each of the at least two parallel gates is implemented using a different set of ions of a plurality of ions in a ion trap, and the plurality of ions include four or more ions. The method further includes simultaneously performing operations on the at least two parallel gates as part of the quantum operations.

This disclosure also describes a trapped-ion quantum system configured to perform quantum operations that includes an algorithms component configured to implement at least two parallel gates of a quantum circuit, each of the at least two parallel gates is a multi-qubit gate; each of the at least two parallel gates is implemented using a different set of ions of a plurality of ions in a ion trap, and the plurality of ions include four or more ions. The trapped-ion quantum system further includes the ion trap in which operations on the at least two parallel gates are simultaneously performed as part of the quantum operations. The trapped-ion quantum system may also be referred to as a universal ion trap quantum computer, a quantum information processing (QIP) system, a quantum computer, or generally as a computer device.

This disclosure also describes a computer-readable storage medium storing code with instructions executable by a processor for performing quantum operations in a trapped-ion quantum system, the computer-readable medium includes code for implementing at least two parallel gates of a quantum circuit, each of the at least two parallel gates is a multi-qubit gate, each of the at least two parallel gates is implemented using a different set of ions of a plurality of ions in a ion trap, and the plurality of ions includes four or more ions. The computer-readable storage medium further includes code for performing operations on the at least two parallel gates simultaneously as part of the quantum operations.

Described herein are additional details regarding the methods, systems, and computer-readable storage medium for various aspects associated with parallel multi-qubit operations using sets of trapped ions.

BRIEF DESCRIPTION OF THE DRAWINGS

The appended drawings illustrate only some implementation and are therefore not to be considered limiting of scope.

DETAILED DESCRIPTION

Figure 1:
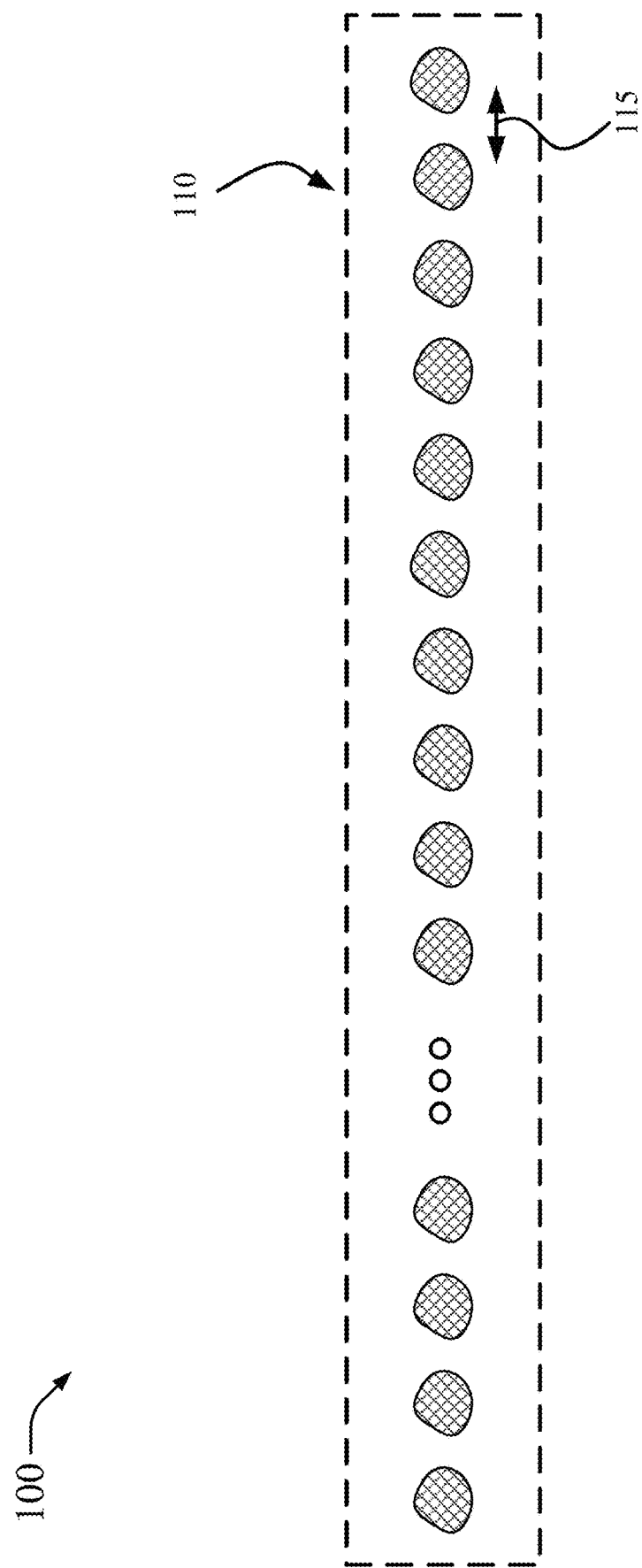
FIG. 1 illustrates a view of a vacuum chamber that houses electrodes for the trapping of atomic ions a linear crystal in accordance with aspects of the disclosure.

The detailed description set forth below in connection with the appended drawings is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, the circuit model of a quantum computer or quantum information processing (QIP) system consists of sequences of gate operations between qubits, drawn from a universal family of discrete operations, and the capability to perform these gates in parallel is crucial for advances in quantum computing technology. The ability to execute simultaneous or parallel quantum gates offers clear efficiency gains for numerous quantum circuits and algorithms. More importantly, quantum gate parallelism is essential for the fault-tolerant error correction of qubits that suffer from idle decoherence. Without gate parallelism, the required error threshold for fault-tolerance may become inaccessibly small for realistic systems. Because quantum error correction is a particularly onerous process, one in which the overhead can be severe, encode large amounts of information need to be encoded for redundancy. Quantum gate parallelism allows for the accumulation of fewer errors, and therefore, a lesser amount of redundancy needs to be encoded.

The implementation of parallel quantum gates, however, is not a simple task. It is typically complicated by potential crosstalk, especially between qubits fully connected by a common-mode bus, such as in Coulomb-coupled trapped atomic ions or cavity-coupled superconducting transmons. In this regard, this disclosure describes parallel two-qubit entangling gates in an array of fully-connected trapped ion qubits. An application of this capability may be implemented in various quantum circuits. One example is an implementation in the quantum full adder, using a depth-4 quantum circuit with parallel multi-qubit operations. These results exploit the power of highly connected qubit systems through classical control techniques, and provide an improvement toward speeding up quantum circuits and achieving fault-tolerance with trapped ion quantum computers. As used herein, the term "multi-qubit" may refer to operations or gates that use of more than one qubit, such as 2-qubits, 3-qubits, 4-qubits, and so on, including n-qubit operations or gates where n is an integer number.

Parallel operations save considerable time over performing operations in series, increasing computational efficiency. Crucial quantum computing circuits such as error correction, the quantum Fourier transform, large entangled states, and adders may all benefit from parallelism. Numerous full quantum algorithms similarly benefit, including Shor's integer factoring, solving the discrete logarithm problem over the elliptic curve group, simulating Hamiltonian dynamics using the Suzuki-Trotter formula, and quantum chemistry algorithms. These improvements are both ubiquitous and substantial. Both full adders and Toffoli gates may gain an exponential improvement in overall execution time using parallelism. Other quantum algorithms see a speedup of $O(n)$ over gate complexities of low-degree polynomials of n.

This disclosure describes various techniques for quantum gate parallelism using trapped ions. Trapped atoms and superconducting circuits may be used to implement trapped ion quantum computers, also referred to as quantum information processing systems. Atomic-based qubits can be used as different type of devices, including but not limited to quantum memories, quantum gates in quantum computers and simulators, and nodes for quantum communication networks. Qubits based on trapped atomic ions can have very good coherence properties, can be prepared and measured with nearly 100% efficiency, and can be readily entangled with each other by modulating their Coulomb interaction with suitable external control fields such as optical or microwave fields. As used in this disclosure, the terms "atomic ions," "atoms," and "ions" may be used interchangeably to describe the particles that are to be confined, or are actually confined, in a trap to form a crystal or similar arrangement or configuration. Also as used in this disclosure, the terms "gates" and "quantum gates" may be used interchangeably.

The typical ion trap geometry or structure used for quantum information processing is the linear radio frequency (RF) Paul trap (also referred to as an RF trap, surface trap, a Paul trap, or simply an ion trap), where nearby electrodes hold static and dynamic electrical potentials that lead to an effective inhomogeneous harmonic confinement of the ions. The RF Paul trap is a type of trap that uses electric fields to trap or confine charged particles in a particular region, position, or location. When atomic ions are laser-cooled to very low temperatures in such a trap, the atomic ions form a stationary crystal of qubits (e.g., a structured arrangement of qubits), with Coulomb repulsion balancing the external confinement force. For sufficient trap anisotropy, the ions can form a linear crystal along the weak direction of confinement, and this is the arrangement typically employed for applications in quantum information and metrology.

Trapped atomic ions are among the most advanced qubit platforms, with atomic clock precision and the ability to perform gates in a fully-connected and reconfigurable qubit network. The high connectivity between trapped ion qubits is mediated by optical forces on their collective motion. Trapped ions can be scaled in a modular fashion by shuttling individual ions between separate chains of ions in complex multi-electrode trap structures or through photonic couplings on- or off-chip. Within a single large chain of ions, gates can be performed by appropriately shaping the laser pulses that drive select ions within the chain. Here, the target qubits become entangled through their Coulomb-coupled motion, and the laser pulse is modulated such that the motional modes are disentangled from the qubits at the end of the operation. The execution of multiple parallel gates in this way requires added complexity of the pulse shapes, not only to disentangle the motion but also to entangle only the target qubits as desired. This type of parallel gate may be achieved with trapped ion technology by designing appropriate optical pulses using nonlinear optimization techniques.

FIG. 1 illustrates a partial view of a vacuum chamber 100 that houses electrodes for the trapping of atomic ions in a chain or linear crystal 110 using an ion trap (e.g., a linear trap). In the example shown in FIG. 1, a vacuum chamber in a quantum system (see e.g., FIG. 10) includes electrodes for trapping multiple atomic Ytterbium ions (e.g., $^{171}$Yb$^+$ ions) which are confined in the linear crystal 110 and are laser-cooled to be nearly at rest. The number of atomic ions trapped can be configurable and in some instances as many as 100 atomic ions or more may be trapped. The atoms are illuminated with laser radiation tuned to a resonance in $^{171}$Yb$^+$ and the fluorescence of the atomic ions is imaged onto a camera. In this example, atomic ions are separated by a distance 115 of about 5 microns (μm) from each other as shown by fluorescence. The separation of the atomic ions is determined by a balance between the external confinement force and Coulomb repulsion.

Strong fluorescence of individual trapped atomic ions relies on the efficient cycling of photons, thus the atomic structure of the ion must have a strong closed optical transition that allows for laser-cooling of the motion, qubit state initialization, and efficient qubit readout. This may rule out many atomic ion species, apart from simple atomic ions with a lone outer electron, such as the alkaline-earths (Be$^+$, Mg$^+$, Ca$^+$, Sr$^+$, Ba$^+$) and particular transition metals (Zn$^+$, Hg$^+$, Cd$^+$, and Yb$^+$). Within these atomic ions, quantum bits can be represented by two stable electronic levels, often characterized by an effective spin with the two states $|\uparrow\rangle$ and $|\downarrow\rangle$, or equivalently $|1\rangle$ and $|0\rangle$.

In this disclosure, aspects of quantum gate parallelism are shown using a chain of five (5) atomic Yb$^+$ ions (see e.g., chain or linear crystal 110 in FIG. 1), with resonant laser radiation used to laser-cool, initialize, and measure the qubits. It is to be understood that the chain of trapped ions may be larger than five atomic ions. Coherent quantum gate operations are achieved by applying counter-propagating Raman beams from a single mode-locked laser, which form beat notes near the qubit difference frequency. Single-qubit gates are generated by tuning the Raman beatnote to the qubit frequency splitting $\omega_0$ and driving resonant Rabi rotations (R(θ, φ) gates) of defined phase and duration. Two-qubit (XX(χ)) gates are realized by illuminating two ions with beat-note frequencies near the motional sidebands, creating an effective Ising interaction between the ions via transient entanglement through the modes of motion. Similar operations can be applied to yield gates between more than two qubits, but a pair is used in this example because two is sufficient for universal logic. A pulse-shaping scheme provides high-fidelity entangling gates on any ion pair. While ion qubit systems have very long coherence times relative to gate time, their coherence times will always be finite, necessitating the use of parallel operations.

In order to perform parallel entangling operations involving M independent pairs of qubits in a chain of N≥2M ions with N motional modes $\omega_k$, a shaped qubit state-dependent force is applied to the involved ions using bichromatic beat notes at $\omega_0 \pm \mu$, resulting in the evolution operator:

$$U_{||}(\tau) = \exp\left(i\sum_{i=0}^{2M} \hat{\phi}_i(\tau)\sigma_i^x + i\sum_{i<j}^{2M} \chi_{ij}(\tau)\sigma_i^x \sigma_j^x\right) \quad (1)$$

where τ is the gate time. The first operator describes state-dependent displacements of each mode k in phase space, with $$\hat{\phi}_i(\tau) = \Sigma_k(a_{i,k}(\tau)\hat{a}_k^\dagger - a_{i,k}^*(\tau)\hat{a}_k) \quad (2)$$

and accumulated displacement value $$a_{i,k}(\tau) = \int_0^\tau \eta_{i,k}\Omega_i(t)\sin(\mu t)e^{i\omega_k t}dt \quad (3)$$

Here $\hat{a}_k^\dagger$ and $\hat{a}_k$ are the raising and lowering operators for mode k, $\eta_{i,k}$ is the Lamb-Dicke parameter coupling qubit i to mode k, and $\Omega_i(t)$ is the Rabi frequency of the ith ion, proportional to the amplitude-modulated laser intensity hitting the ion. In some implementations, frequency or phase modulation of the laser pulses may be used in connection with or alternatively to amplitude modulation. The second operator in Equation (1) entangles qubits i and j and is given by $$\chi_{ij}(\tau) = 2\int_0^\tau dt' \int_0^{t'} dt \sum_k \eta_{i,k}\eta_{j,k}\Omega_i(t)\Omega_j(t) \times \sin(\mu t)\sin(\mu t')\sin(\omega_k(t'-t)). \quad (4)$$

At the end of the gate operation, the 2MN accumulated displacement values in Equation (3) for the 2M involved ions and N modes should vanish so that all mode trajectories close in phase space and there is no residual qubit-motion entanglement. For each of the M desired entangled pairs χ=π/4 would be required for maximal entanglement (or other nonzero values for partial entanglement), and for the other crosstalk pairs of qubits, χ=0. This yields a total of $$2MN + \binom{2M}{2}$$

constraints for designing appropriate pulse sequences $\Omega_i(t)$ to implement the M parallel entangling gates. To provide optimal control during the gate and fulfill these constraints, we divide the laser pulse at ion i into S segments of equal time duration τ/S, and vary the amplitude in each segment as an independent variable. In order to implement independent XX gates, independent signals are implemented on the M ion pairs that are to entangle, which are necessary to provide sufficient control to simultaneously entangle the desired ion pairs only.

While the 2MN motional mode constraints (see e.g., Equation (3)) are linear, the $$\binom{2M}{2}$$

entanglement constraints (see e.g., Equation (4)) are quadratic. Finding pulse solutions to this non-convex quadratically constrained quadratic program (QCQP) is an NP-hard problem in the general case. Because analytical approaches are intractable, optimization techniques may be used to find solutions that fit the constraints as well as possible. The constraint problem setup and derivation of the fidelity of simultaneous XX gate operations is a function of the above control parameters.

As described above, an illustrative implementation of parallel gates is one that may be implemented for two (2) independent ion pairs in a 5-ion chain. In one approach, the optimization scheme used the built-in MATLAB unconstrained multivariable optimization function "fminunc", where the objective function included the above constraints on $\alpha$ and $\chi$ parameters, as well as a term to minimize power. Sequences may be calculated for a gate time of $\tau_{gate}$=250 μs, which is comparable to the standard multi-qubit XX gates already used on other similar experiments, and for a range of detunings μ. This approach may generate a selection of solutions, which may be tested on an experimental setup, where the solution that generates the highest-quality gate using the least amount of power may be chosen.

The experimental setup is performed on a linear chain of five trapped $^{171}$Yb$^+$ ions that are laser cooled to near their ground state. The qubits are designated as the |0>≡|F=0; $m_F$=0> and |1>≡|F=1; $m_F$=0> hyperfine-split electronic states of the ion's $^2S_{1/2}$ manifold, which are first-order magnetic-field-insensitive clock states with a splitting of 12.642821 GHz. Coherent operations are performed by counter-propagating Raman beams from a single 355 nm mode-locked laser. The first Raman beam is a global beam applied to the entire chain, while the second is split into individual addressing beams to target each ion qubit. Additionally, a multi-channel arbitrary waveform generator (AWG) provides separate RF control signals to each ion's individual addressing beam, providing the individual phase, frequency, and amplitude controls necessary to execute independent multi-qubit operations in parallel. That is, each ion is individually addressed using an addressing beam for that ion, and the characteristics of that addressing beam (e.g., phase, frequency, amplitude) are controlled to provide the appropriate pulse sequence for that ion. Qubits are initialized to the |0> state using optical pumping, and read out by separate channels of a multi-channel photomultiplier tube (PMT) array using state-dependent fluorescence.

Figure 2A:
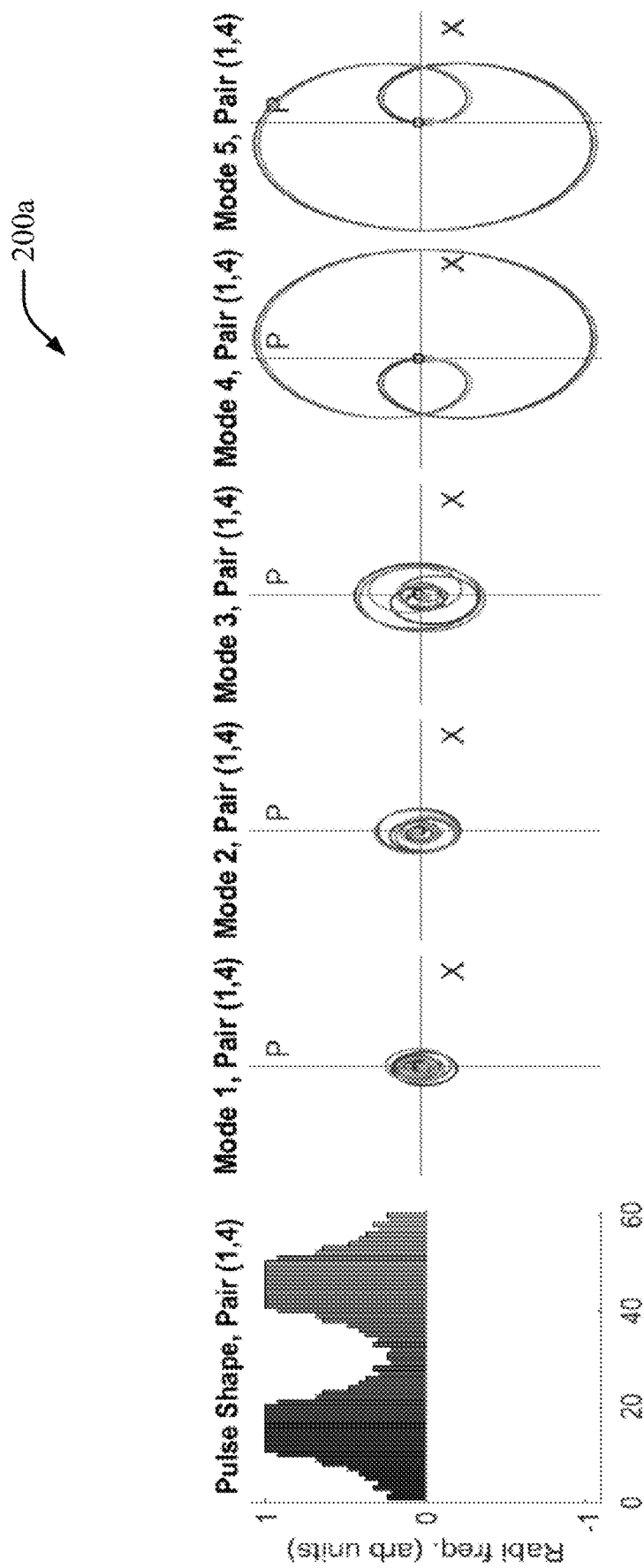
FIGS. 2A and 2B illustrate examples of pulse shape solutions and theoretical phase space trajectories for parallel XX or Ising gates implemented on ions (1,4) and (2,5) of a 5-ion trap in accordance with aspects of the disclosure.
Figure 2B:
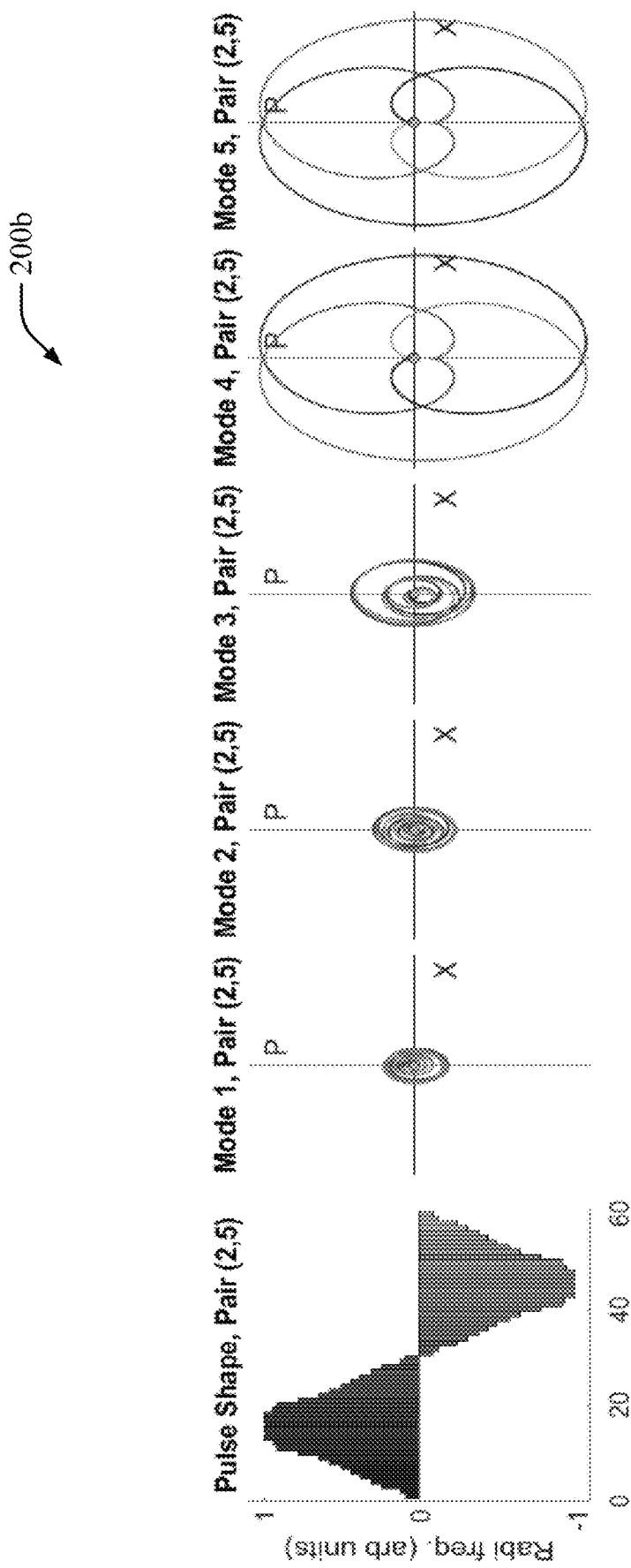

From the five trapped $^{171}$Yb$^+$ ions, experimental gates were found for 6 ion pair combinations: (1,4) and (2,5); (1,2) and (3,4); (1,5) and (2,4); (1,4) and (2,3); (1,3) and (2,5); (1,2) and (4,5). FIGS. 2A and 2B show in diagrams 200*a* and 200*b*, respectively, the pulse sequence applied to each entangled pair to construct a set of parallel multi-qubit gates on ions (1,4) and (2,5), as well as the trajectories in phase space of each mode-pair interaction. The 5 transverse motional modes in this 5 ion chain have sideband frequencies $v_z$={3.045, 3.027, 3.005, 2.978, 2.946} MHz, where mode 1 is the 3.045 MHz common mode. The phase space (P,X) trajectories (to the right of the pulse sequences) show that the mode interactions closest to the selected detuning exhibit the greatest displacement, and contribute the most to the final spin-spin entanglement by enclosing more of phase space.

Negative-amplitude pulses are implemented by inverting the phase of the control signal. This capability is useful, as changing the control signal phase allows the entangling pairs to continue accumulating entanglement while cancelling out accumulated entanglement with cross-talk pairs. To that end, the initial guess used for the gates in the optimization protocol was that one pair would have all positive-amplitude shape, while the other pair would see positive amplitudes for the first half, and negative amplitudes for the second half of the gate. The pulse shapes in FIGS. 2A and 2B provide a good example of this. Other pulse solutions (i.e., other pulse shapes and phase space trajectories) may feature similar patterns with some kind of symmetry, increasing and decreasing segment amplitudes, and phase flips on one pair to cancel out crosstalk entanglement.

Further with respect to FIGS. 2A and 2B, the pulse shape solutions and theoretical phase space trajectories shown are for parallel XX gates on ions (1,4) and (2,5), with gate time 250 μs, detuning=2.962 MHz, and theoretical fidelity 99.63%. As mentioned above, these figures illustrate the pulse sequence that is generated and applied to each entangled pair to construct the respective gate, showing the relative Rabi frequency during each segment of the gate. Negative segments have an inverted phase. These figures also illustrate the trajectories in phase space of each mode-ion interaction, plotting $\alpha_{i,k}$ over the course of the gate. Ions that see the same pulse shape have symmetric mode-ion trajectories. The phase space trajectories start out at an open circle and follow the path to end. The plots have axes of the same size, so relative engagement of each mode is shown.

In this disclosure, experimental results from implementing parallel multi-qubit entangling gates on several ion pair selections are described. Fidelities are calculated by performing the parallel gates followed by an analysis pulse, then using the calculated parity with results from bare parallel gates to determine the fidelity. The analysis pulses are rotations using the SK1 composite pulse for increased robustness against errors in the rotation angle. For the four ions involved in each operation (e.g., two ions for the two parallel multi-qubit gates), the parity analysis may be performed for all 6 possible pairs within the set, allowing for analysis of the two entangled ion pairs as well as the 4 crosstalk pairs. Parity curves are shown in the diagrams 300*a* and 300*b* in FIGS. 3A and 3B, respectively. Entangling gate fidelities were typically between 96-99%, with crosstalk of a few percent.

Figure 3A:
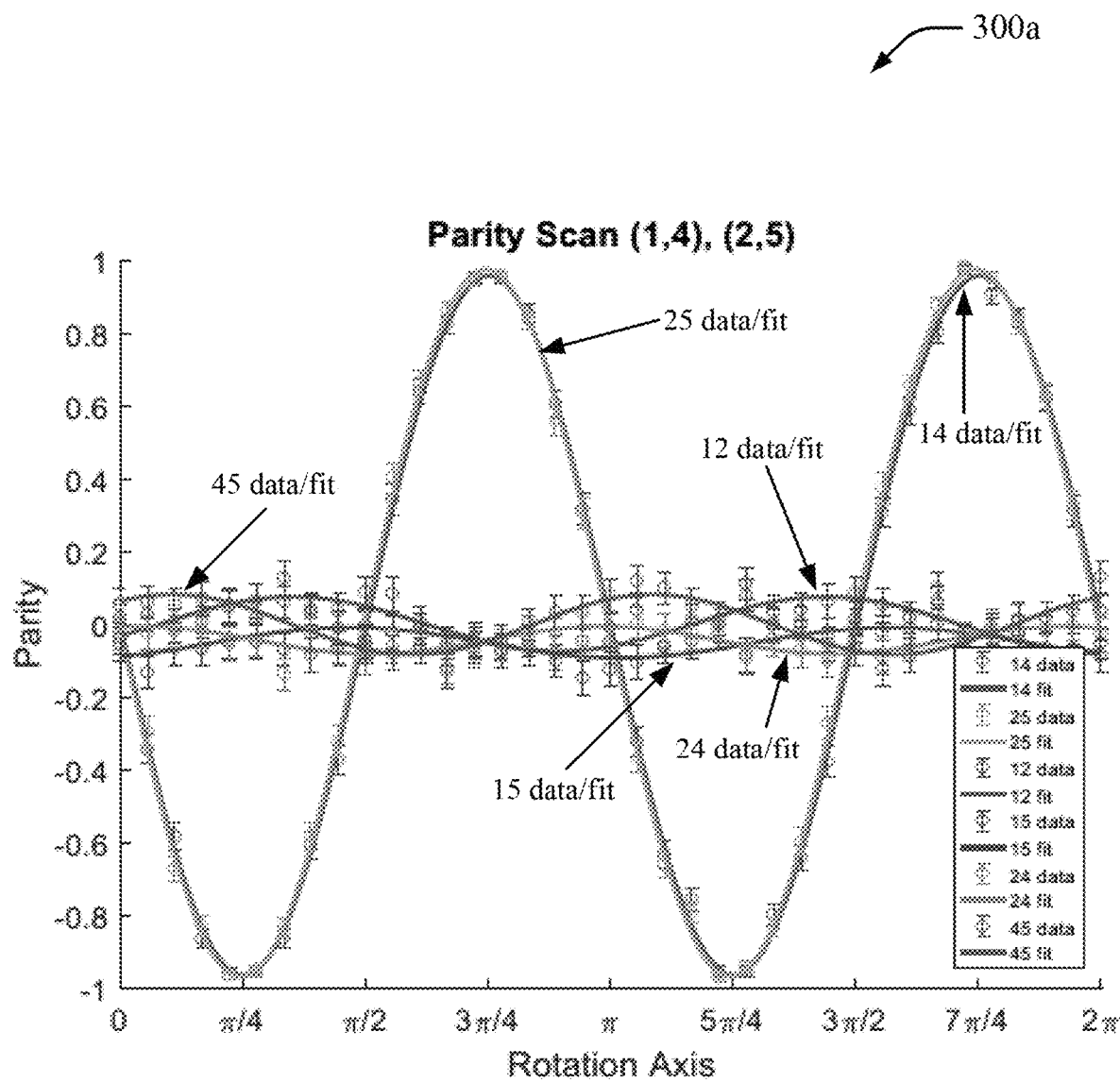
FIGS. 3A and 3B illustrate examples of parity curves and fidelities for parallel XX gates on two example sets of ions of a 5-ion trap in accordance with aspects of the disclosure.
Figure 3B:
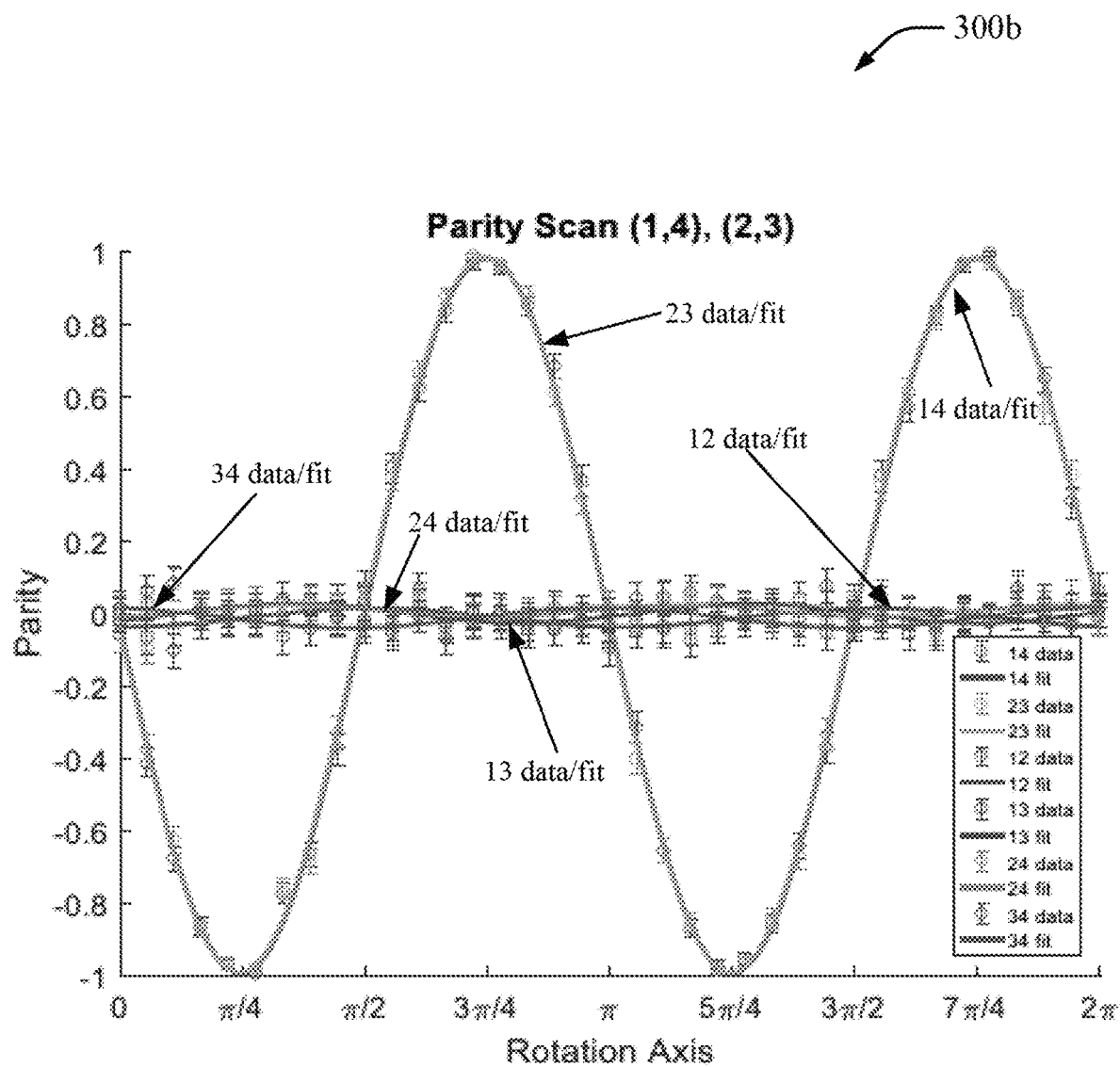

Further with respect to FIGS. 3A and 3B, parity curves and fidelities for parallel XX gates on two example sets of ions (e.g., set (1,4) and (2,5), and set (1,4) and (2,3) are described. In the diagram 300*a* in FIG. 3A, the set including ions (1,4) and (2,5) yields fidelities of 96.5(4)% and 97.8(3)% on the respective entangled pairs, with an average crosstalk error of 3.6(3)% and corrected for 3% state preparation and measurement (SPAM) errors. In the diagram 300*b* in FIG. 3B, the set including ions (1,4) and (2,3) yields fidelities of 98.8(3)% and 99.0(3)% on the respective entangled pairs, with an average crosstalk error of 1.4(3)% and corrected for <1% SPAM errors. These figures show both individual data points and fit lines for those data points. For example, in the diagram 300*a* in FIG. 3A the data points/fit line for (1,4) ("14 data/fit) and for (2,5) ("25 data/fit) show highest parity, and in the diagram 300*b* in FIG. 3B the data points/fit line for (1,4) ("14 data/fit) and for (2,3) ("23 data/fit) show highest parity.

The given errors described above are statistical. Data has been corrected for SPAM errors. Crosstalk errors were found by fitting the crosstalk pair parity scan to a sine curve as if it were a normal parity flop, calculating its fidelity as an entangling gate and subtracting out the 25% base fidelity that represents a complete statistical mixture. Any fidelity above that represents a correlation or small amount of entanglement that is considered an error for these purposes. All crosstalk fidelities for all pairs were close to 25%, indicating that no crosstalk pairs had verifiable entanglement.

Figure 4:
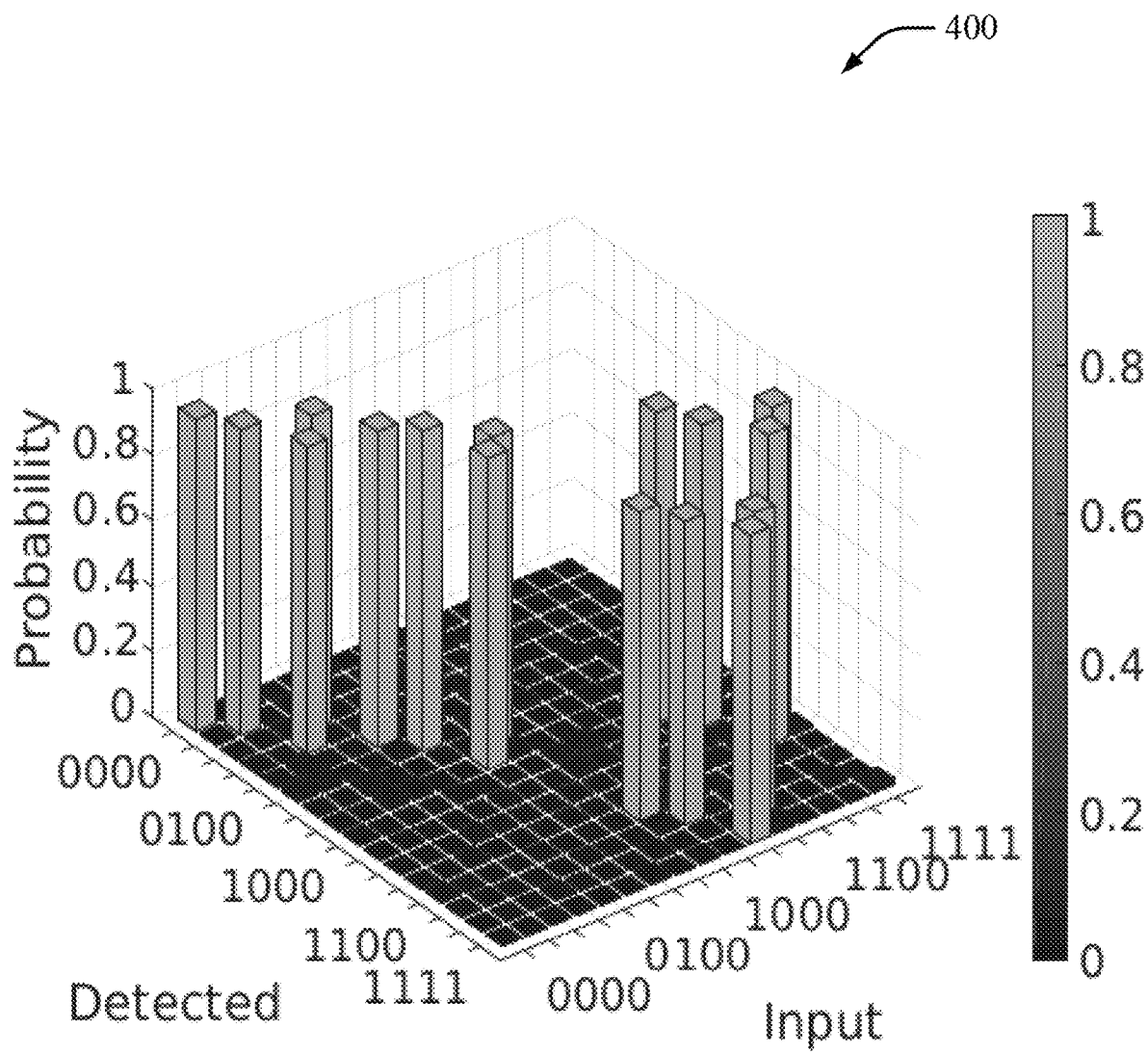
FIG. 4 illustrates an example of data for simultaneous CNOT gates on ions (1,4) and (2,3) of a 5-ion trap in accordance with aspects of the disclosure.

As an example application of a parallel operation useful for error correction codes, a pair of CNOT gates may be performed in parallel on two pairs of ions. The CNOT gate sequence (e.g., a compiled version with R and XX gates) was performed simultaneously on the pair(1, 4), with ion 1 acting as the control and ion 4 acting as the target, and on the pair (2, 3), with ion 2 acting as the control and ion 3 acting as the target. Each constituent operation in the composite gate is performed in parallel, with each rotation (e.g., R) performed at the same time as the corresponding rotation on the other pair, and the two XX gates performed using parallel XX gates on ion pairs (1, 4) and (2, 3). The simultaneous CNOT gates were performed for each of the 16 possible bitwise inputs, and population data for the 16 possible bitwise outputs is shown in a diagram 400 in FIG. 4 with an average process fidelity of 94.5(2)% and corrected for average SPAM errors of 5%.

Figure 5A:
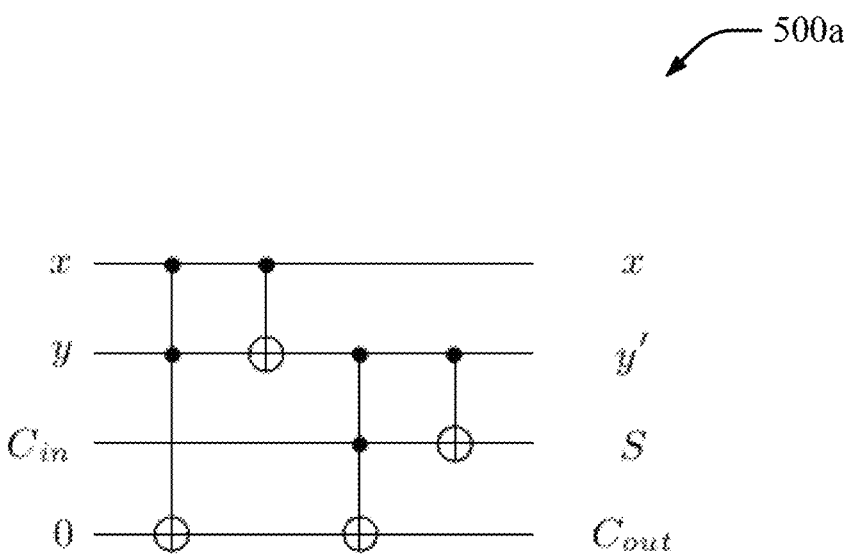
FIG. 5A illustrates an example of Feynman's original quantum full adder in accordance with aspects of the disclosure.
Figure 5B:
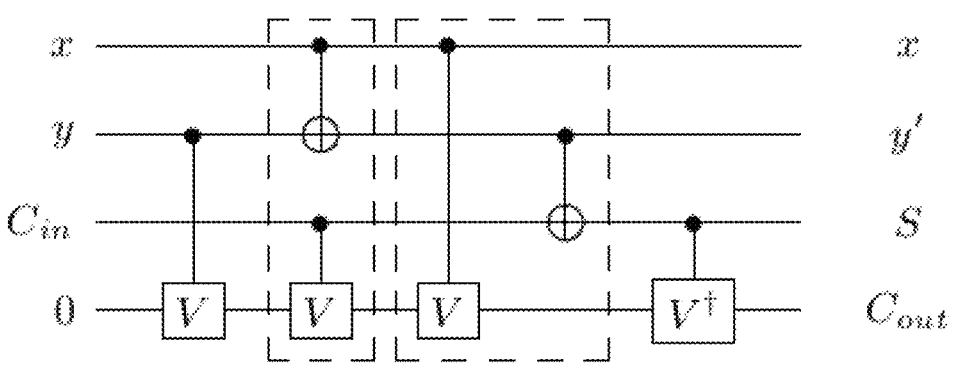
FIG. 5B illustrates an example of an optimized full adder with multi-qubit gate depth 4 in accordance with aspects of the disclosure.

In addition to the examples presented above, similar techniques may be useful in other types of quantum circuits or simulations. For example, in modern classical computing, a full adder is a basic circuit that can be cascaded to add many-bit numbers, and can be found in processors as components of arithmetic logic units (ALU's) and performing low-level operations like computing register addresses. The quantum full adder requires four (4) qubits, the first three (3) for the inputs x, y, and the carry bit $C_{in}$, and the fourth a qubit initialized to |0>. The four outputs consist of the first input, x, simply carrying through; y', which carries x⊕y (an additional CNOT can be added to extract y if desired); and the sum S and output carry $C_{out}$, which together comprise the 2-bit result of summing x, y, and $C_{in}$, where $C_{out}$ is the most significant bit and hence becomes the carry bit to the next adder in the cascade, and S is the least significant bit. The sum may also be written as $S=x \oplus y \oplus C_{in}$ and the output carry as $C_{out}=(x \cdot y) \oplus (C_{in} \cdot (x \oplus y))$. Feynman first designed such a circuit using CNOT and Toffoli gates, shown in a diagram 500a in FIG. 5A, which would require twelve (12) XX gates to implement on an ion trap quantum computer. A more efficient circuit requiring at most six (6) multi-qubit interactions has been described. It has the further advantage of being reduced to a gate depth of 4 if simultaneous multi-qubit operations are available, as shown by the dashed outlines a diagram 500b in FIG. 5B.

Figure 6:
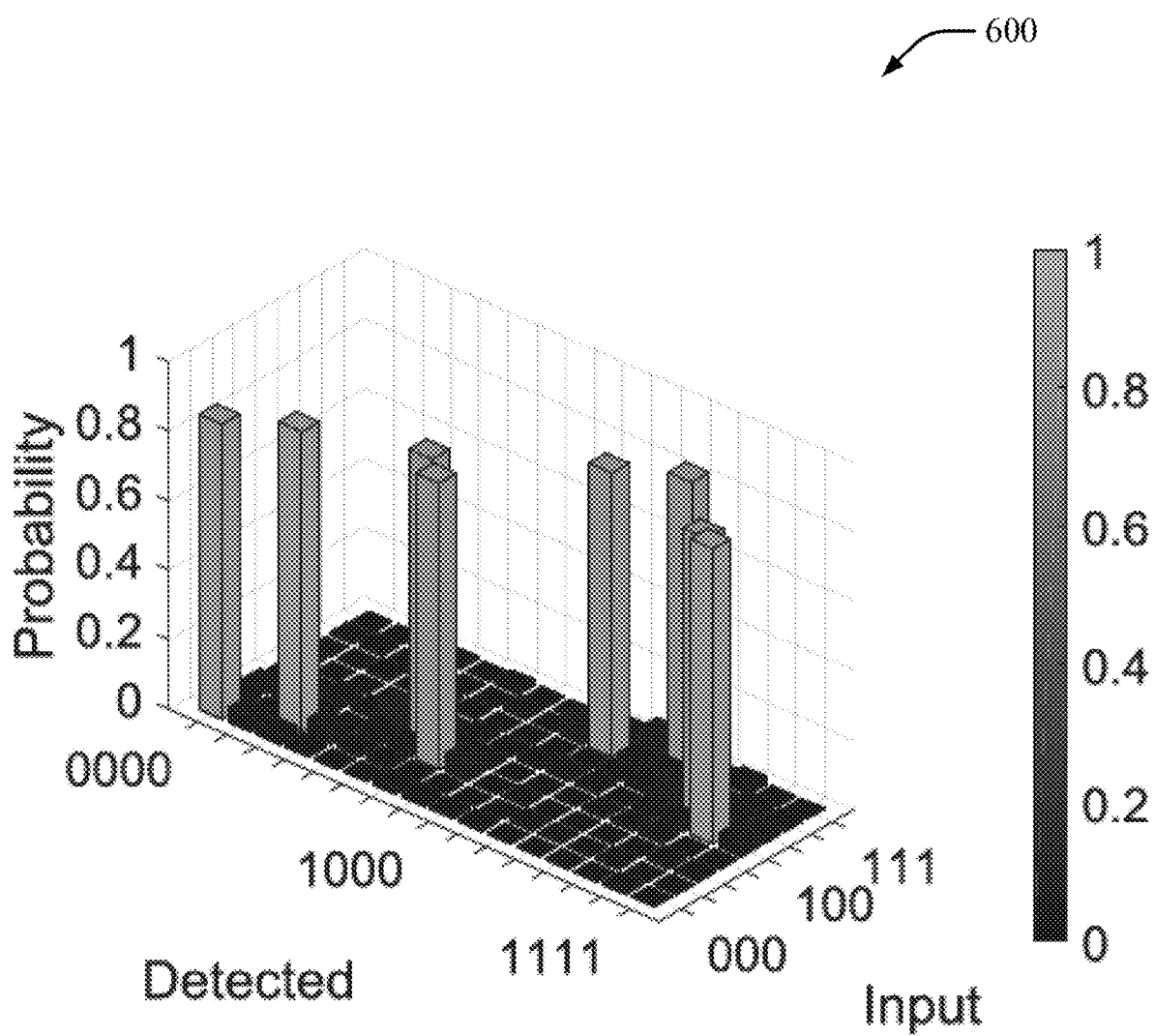
FIG. 6 illustrates an example of data for full adder using simultaneous multi-qubit gates on ions (1, 2, 4, 5) of a 5-ion trap in accordance with aspects of the disclosure.
Figure 7:
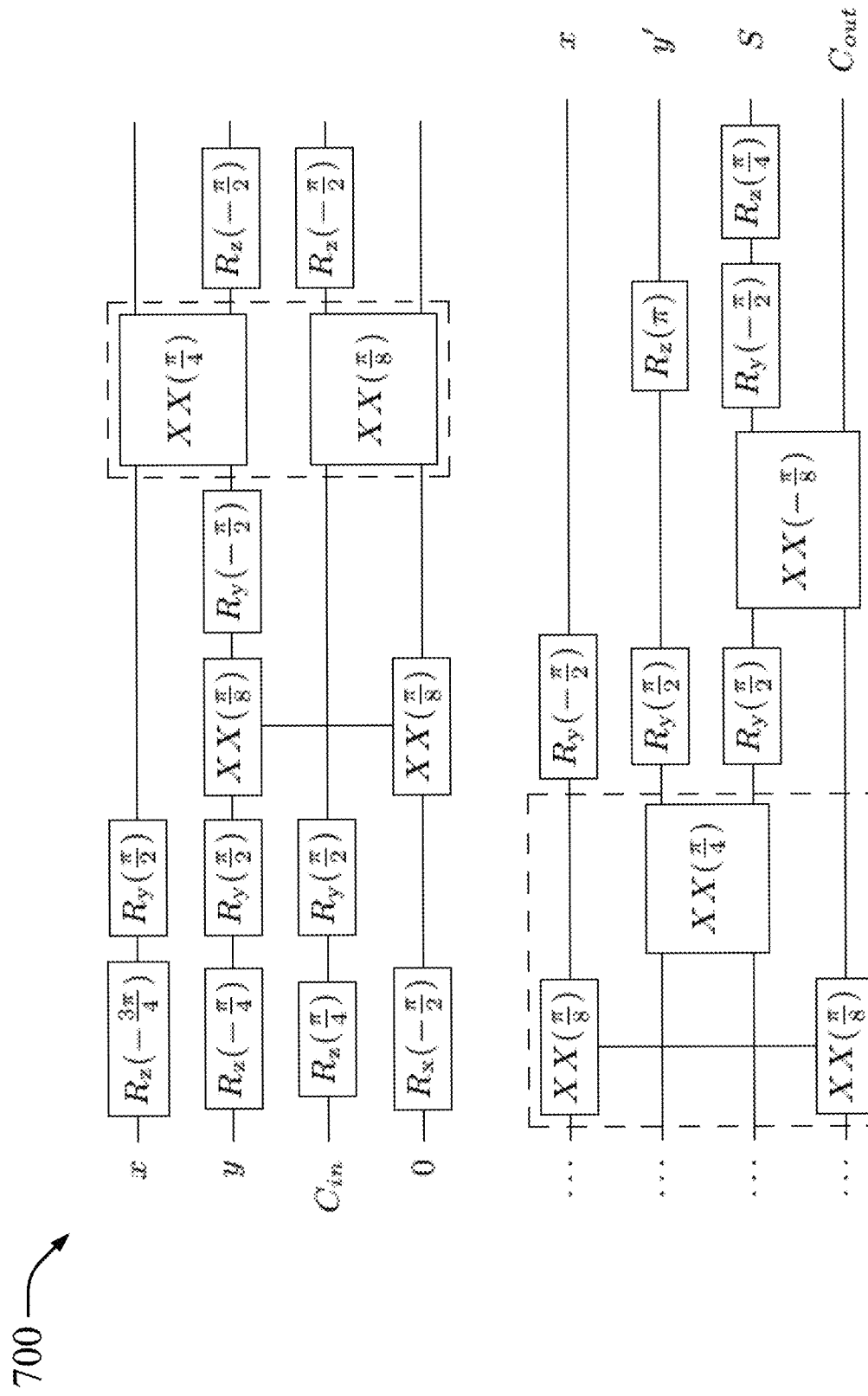
FIG. 7 illustrates an example of an application-optimized full adder implementation using $XX(\chi)$, $R_x(\theta)$, and $R_y(\theta)$ gates with two parallel multi-qubit operations outlined in dashed boxes in accordance with aspects of the disclosure.

Another implementation of the full adder using 2 different parallel XX gate configurations, as well as the rotations and additional XX gates shown in a diagram 700 in FIG. 7. This implementation may be achieved by taking a representation of the full adder in the diagram 500b in FIG. 5B and combining CNOT, C(V), and C(V†) gates and further optimizing the rotations. The parallel gates required different amounts of entanglement, equivalent to implementing a fully-entangling $$XX\left(\frac{\pi}{4}\right)$$

gate and a partially-entangling $$XX\left(\frac{\pi}{8}\right)$$

gate in parallel. This was experimentally implemented by independently adjusting the optical power supplied to each gate. The inputs x, y, $C_{in}$, and |0> were mapped to the qubits (1, 2, 4, 5) respectively. A diagram 600 in FIG. 6 shows the resulting data from implementing this algorithm, with all 8 possible bitwise inputs on the 3 input qubits, and displaying the populations in all 16 possible bitwise outputs on the 4 qubits used. The data yielded an average process fidelity of 83.3(3)%, and was corrected for average SPAM errors of 3%.

In connection with the examples described herein, calculating or measuring the fidelity of a multi-qubit XX(χ) entangling gate can be done by scanning the phase φ of a global $$\frac{\pi}{2}$$

rotation applied after performing the XX gate and calculating the parity at each point of the scan. Moreover, parallel gates can be calibrated independently from one another by adjusting a scaling factor that controls the overall power on the gate without modifying the pulse shape. Adjusting a scaling factor that controls the power on a single ion only affects the gate in which it participates by modifying the total amount of entanglement, without any apparent ill effects on the gate quality. In addition, since the XX gates in the parallelization scheme have independent calibration, the χ parameters of the two XX gates may be independent. The continuously-variable parameter χ is directly related to the amount of entanglement generated between the two qubits, and this parameter can be adjusted on the experiment or implementations by scaling the power of the overall gate. Consequently, it is possible to simultaneously implement the two XX gates with different degrees of entanglement, as described above, which may prove useful in some applications.

Faster multi-qubit gates can be accomplished with more optical power, but this speedup is limited by sideband resolution, a limitation that gets worse as the processor size grows due to spectral crowding. Parallel multi-qubit operations are a tool to speed up computation that avoids this problem. In connection with the optical power requirements, while the gate time $\tau_{gate}$=250 μs for running 2 XX gates in parallel is comparable to that of a single XX gate (and consequently, half the time it would take to execute two XX gates in series), the parallel gates scheme requires somewhat more optical power. The Rabi frequency Ω is proportional to the square root of the beam intensity I, $\Omega \propto \sqrt{I_0 I_1}$, where $I_0$ and $I_1$ are the beam intensities for the individual and global beams. We can therefore calculate the ratio $R_{\parallel}$ of the power for a gate executed in parallel to the power required for a single XX gate on the same ions as $$R_{\parallel} = \frac{P_{\parallel}}{P_{XX}} = \frac{I_{\parallel}}{I_{XX}} = \left(\frac{\Omega_{\parallel}}{\Omega_{XX}}\right)^2. \tag{5}$$

Since intensity is power per unit area, and the beam size does not vary, this cancels out. Power ratios for each gate are shown in Table I. While some gates required rather more power (for example, a solution for (1,2), (3,4) that is both high-quality and low power is a challenge), most gates performed in parallel require about two to four times as much power as their singly-performed counterparts. However, a full accounting of power requirements on this experiment must also take into account power wasted by unused beams, and the total time required to perform equivalent operations beams on at all times and are dumped after the AOM when not in use, any ion not illuminated corresponds to an individual beam wasting power. Running 2 XX gates in parallel takes $\tau_{gate}$=250 μs and uses beams each with power P to illuminate 4 ions, but performing those same 2 gates in series using stand-alone XX gates requires time $2\tau_{gate}$ and uses 4 beams each with power P/4 to P/2 to illuminate 2 ions, wasting 2 beams. This yields a choice of using twice the power (or more) in half the time versus half the power in twice the time, the outcome depending on the gate in question. Thus, parallel gates are then very useful when laser power is available and the benefits of parallelism than time.

TABLE I

For each pair of parallel XX gates implemented, comparison of power required to perform each component XX with its corresponding standalone multi-qubit XX gate by calculating the power ratio $R_{|,|}$.

| Parallel Gate Pairs | $R_{|,|}$, Pair 1 | $R_{|,|}$, Pair 2 |
|---|---|---|
| (1, 4) and (2, 5) | 4.3 | 1.8 |
| (1, 2) and (3, 4) | 7.9 | 5.0 |
| (1, 5) and (2, 4) | 2.1 | 1.6 |
| (1, 4) and (2, 3) | 4.3 | 3.8 |
| (1, 3) and (2, 5) | 0.9 | 1.5 |
| (1, 2) and (4, 5) | 2.2 | 2.2 |

The control scheme presented here for parallel multi-qubit entangling gates in ions also suggests a method for performing multi-qubit entanglement in a single operation. Of particular interest is the creation of Greenberger-Horne-Zeilinger (GHZ) states. The GHZ state is a certain type of entangled quantum state that involves at least three subsystems (particles). That is, GHZ states are a class of non-biseparable maximally-entangled multi-qubit states.

The same optimization approach to produce pulse shapes for parallel multi-qubit entangling gates may be used to create GHZ states when applied to the ions. Unlike with parallel gates, however, it may be necessary to allow independent pulse shapes on all 4 ions, rather than solving for pairwise solutions; this will provide more free parameters. Additional challenges may include finding effective calibration techniques when implementing such gates on the experiment, since there will be 6 interactions that will all need to be at the same strength, but only 4 control signals. The current approach of calibrating a multi-qubit gate by adjusting the overall power for the pulse shape applied by the control signal may have limited applicability to GHZ states and techniques that involve more degrees of freedom may be needed, such as independently adjusting the power for different segments of the pulse shape on each ion.

The benefits of implementing GHZ states with fewer gates would be significant, as it would substantially reduce the circuit depth of several important algorithms. While the use of axial modes for multi-qubit GHZ states has been described, the scheme described herein represents a new method for use with radial mode interactions. With only multi-qubit gates available, building a GHZ state of size N requires O(N) multi-qubit gates. With parallel multi-qubit gates available, however, the gate depth required to build a GHZ state is reduced to O (log(N)). This may be accomplished with a binary tree algorithm by dividing all qubits into pairs and entangling those pairs in parallel, then entangling pairs of these pairs, and so on until all are entangled. A single-operation GHZ state would drop this circuit depth to unity. Single-operation GHZ state construction will greatly enhance the efficiency of several algorithms. For example, arbitrary stabilizer circuits require $$O\left(\frac{N^2}{\log(N)}\right)$$

CNOT gates, but could be implemented in O(N) gates with single-operation GHZ state circuitry. Single-operation GHZ state creation will also benefit applications such as quantum secret sharing, Toffoli-N gates, the quantum Fourier transform, and quantum Fourier adder circuits.

Another aspect of this disclosure is the scalability of the techniques described herein. For example, the scaling outlook on simultaneous gates is polynomial or better in the number of constraints to consider when calculating optimal solutions. Two parallel XX gates in a chain of N ions requires 4N+6~O(N) constraints, so the problem growth is linear in N. Entangling more pairs at once grows quadratically: entangling M pairs involves the interactions of 2M ions, yielding the number of spin-spin interactions we must control to be $$\binom{2M}{2} = \frac{(2M)!}{2!(2M-2)!} = 2M^2 - M \sim O(M^2) \qquad (6)$$

and the number of spin-motion interactions to be the number of ions times the number of modes, 2MN. Scaling both the number of entangled pairs M and the number of ions N in the chain therefore gives a total problem growth rate of $$2MN+2M^2 \sim M \sim O(M^2+MN). \qquad (7)$$

On very long chains, not all ion-ion connections will be directly available, reducing the number of quadratic constraints on crosstalk pairs that must be considered, indicating that this is an upper bound on the scaling.

Increases in solution fidelity may be needed to improve on the techniques described herein. Easing constraints on the power needed may allow for higher-fidelity solutions to be calculated, although increasing power on the experiment can exacerbate errors due to Raman beam noise. An improvement may involve determining whether constraint matrices based on segment amplitudes for the entangling pairs can be modified to become positive or negative semidefinite, as convex QCQP's are readily solved using semidefinite programming techniques and could allow for higher-fidelity solutions. However, these issues are all ones of overhead. Once a high-quality gate solution is implemented on the experiment, no further calculations are needed, and only a single calibration may be required to compensate for Rabi frequency drifts.

Figure 8:
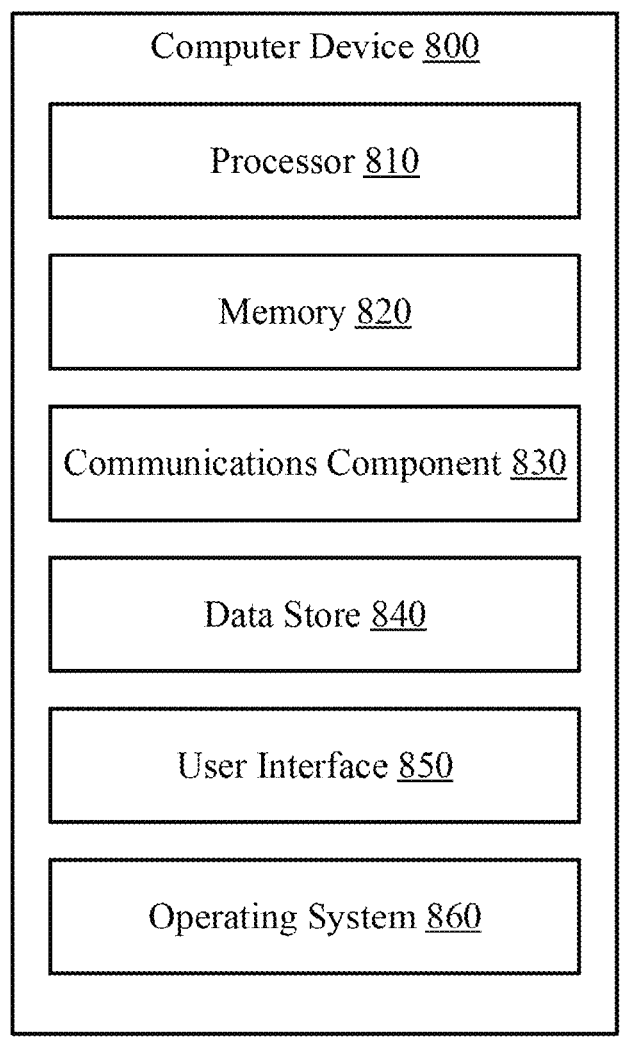
FIG. 8 is a diagram that illustrates an example of a computer device in accordance with aspects of this disclosure.

Referring now to FIG. 8, illustrated is an example computer device 800 in accordance with aspects of the disclosure. The computer device 800 can represent a single computing device, multiple computing devices, or a distributed computing system, for example. The computer device 800 may be configured as a quantum computer, a classical computer, or a combination of quantum and classical computing functions. For example, the computer device 800 may be used to process information to generate or implement the various techniques described herein for enabling parallel multi-qubit operations in different quantum circuits, algorithms, experiments, or simulations, and any related features including, for example, performing multi-qubit entanglement in a single operation (e.g., GHZ states). The computer device 800 may be used as a quantum computer or a QIP system such as, but not limited to, a trapped-ion quantum computer or system. A generic example of QIP system that can be used to implement aspects of the computer device 800 is illustrated in an example shown in FIG. 10.

In one example, the computer device 800 may include a processor 810 for carrying out processing functions associated with one or more of the features described herein. For example, the processor 810 may be used to control operations of the computer device 800 to implement, perform, and/or execute parallel multi-qubit operations in different quantum circuits, algorithms, experiments, or simulations, and any related features including, for example, performing multi-qubit entanglement in a single operation (e.g., GHZ states). The processor 810 may include a single or multiple set of processors or multi-core processors. Moreover, the processor 810 may be implemented as an integrated processing system and/or a distributed processing system. The processor 810 may include a central processing unit (CPU), a quantum processing unit (QPU), a graphics processing unit (GPU), or combination of those types of processors.

In an example, the computer device 800 may include a memory 820 for storing instructions executable by the processor 810 for carrying out the functions described herein. In an implementation, for example, the memory 820 may correspond to a computer-readable storage medium that stores code or instructions to perform one or more of the functions or operations described herein. In one example, the memory 820 may include instructions to perform aspects of a method 900 described below in connection with FIG. 9. In one example, the memory 820 may be used to store information about the pulse sequences to be used to generate different sets of parallel multi-qubit gates.

Further, the computer device 800 may include a communications component 830 that provides for establishing and maintaining communications with one or more parties utilizing hardware, software, and services as described herein. The communications component 830 may carry communications between components on the computer device 800, as well as between the computer device 800 and external devices, such as devices located across a communications network and/or devices serially or locally connected to computer device 800. For example, the communications component 830 may include one or more buses, and may further include transmit chain components and receive chain components associated with a transmitter and receiver, respectively, operable for interfacing with external devices.

Additionally, the computer device 800 may include a data store 840, which can be any suitable combination of hardware and/or software, that provides for mass storage of information, databases, and programs employed in connection with implementations described herein. For example, the data store 840 may be a data repository for operating system 860 (e.g., classical OS, or quantum OS). In one implementation, the data store 840 may include the memory 820.

The computer device 800 may also include a user interface component 850 operable to receive inputs from a user of the computer device 800 and further operable to generate outputs for presentation to the user or to provide to a different system (directly or indirectly). The user interface component 850 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 850 may include one or more output devices, including but not limited to a display, a speaker, a haptic feedback mechanism, a printer, any other mechanism capable of presenting an output to a user, or any combination thereof.

In an implementation, the user interface component 850 may transmit and/or receive messages corresponding to the operation of the operating system 860. In addition, the processor 810 may execute the operating system 860 and/or applications or programs (e.g., programs, algorithms, simulations, experiments that use quantum gates), and the memory 820 or the data store 840 may store them.

When the computer device 800 is implemented as part of a cloud-based infrastructure solution, the user interface component 850 may be used to allow a user of the cloud-based infrastructure solution to remotely interact with the computer device 800.

Figure 9:
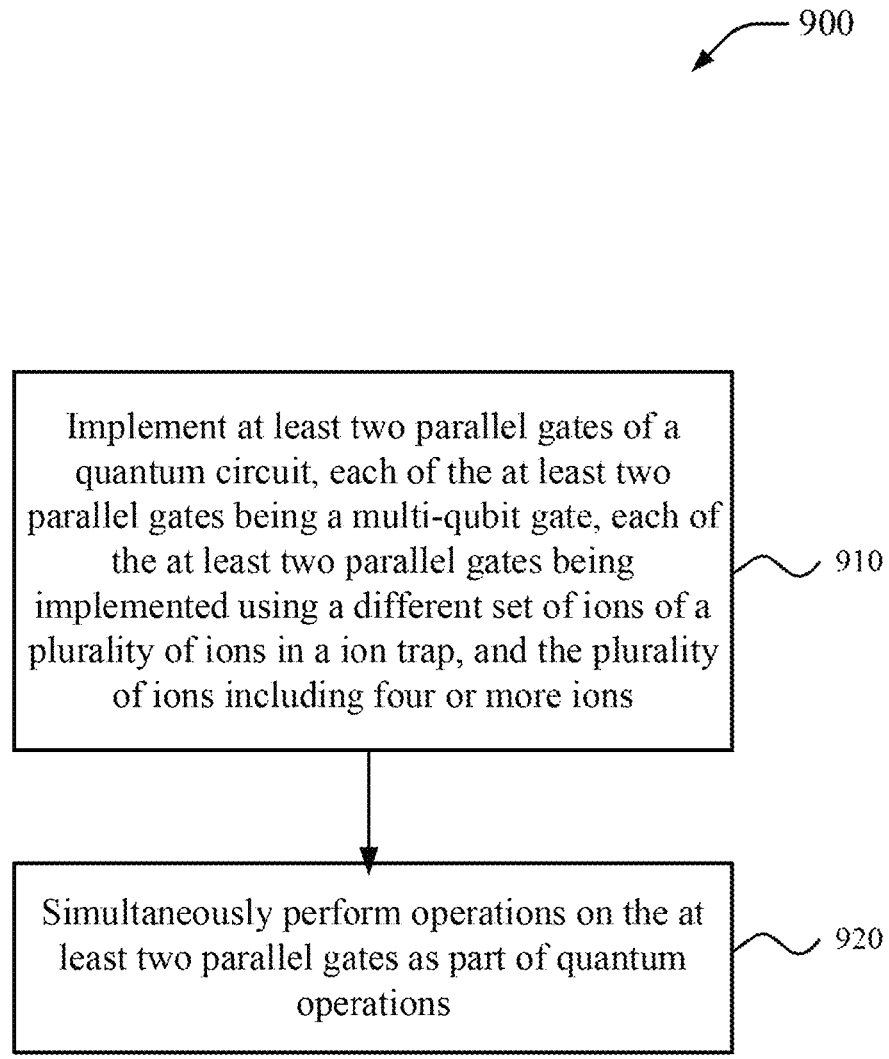
FIG. 9 is a flow diagram that illustrates an example of a method in accordance with aspects of this disclosure.

FIG. 9 is a flow diagram that illustrates an example of a method 900 of performing quantum operations in a trapped-ion quantum system in accordance with aspects of this disclosure. In an aspect, the method 900 may be performed a trapped-ion quantum system such as the computer device 800 described above, where, for example, the processor 810, the memory 820, the data store 840, and/or the operating system 860 may be used to perform the functions of the method 900. The a trapped-ion quantum system for performing the method 900 may also be a QIP system such as the one described below in connection with FIG. 10.

At 910, the method 900 includes implementing at least two parallel gates of a quantum circuit, each of the at least two parallel gates being a multi-qubit gate, each of the at least two parallel gates being implemented using a different pair of ions of multiple ions in a ion trap, and the multiple ions including four or more ions.

At 920, the method 900 includes simultaneously performing operations on the at least two parallel gates as part of the quantum operations.

In another aspect of the method 900, the at least two parallel gates include a first gate and a second gate, the first gate is implemented using a first pair of ions of the multiple ions and the second gate is implemented using a second pair of ions of the multiple ions, the first pair of ions and the second pair of ions are entangled pairs, and any remaining pairs of ions of the multiple ions in the ion trap are not entangled pairs. Ions in the first pair of ions are located in any two of positions in the ion trap, and ions in the second pair of ions are location in any two of the remaining positions in the ion trap.

In another aspect of the method 900, the implementing of the at least two parallel gates of the quantum circuit includes generating optical pulse sequences that are applied to the first pair of ions to construct the first gate and to the second pair of ions to construct the second gate in parallel with the first gate. Moreover, generating of the optical pulse sequences includes retrieving stored information to generate the optical pulse sequences for constructing the first gate using the first pair of ions and the second gate using the second pair of ions. Additionally, generating of the optical pulse sequences includes: generating a first pulse sequence to construct the first gate, the first pulse sequence having multiple segments for the first gate, each segment of the first pulse sequence corresponding to a relative frequency during that segment of the first gate, and the segments of the first pulse sequence being of equal duration; and generating a second pulse sequence to construct the second gate, the second pulse sequence having multiple segments for the second gate, each segment of the second pulse sequence corresponding to a relative frequency during that segment of the second gate, and the segments of the second pulse sequence being of equal duration.

In another aspect of the method 900, the at least two parallel gates are both XX gates.

In another aspect of the method 900, the at least two parallel gates are both CNOT gates.

In another aspect of the method 900, the at least two parallel gates have different amounts of entanglement. For example, the at least two parallel gates include a first gate and a second gate, and the first gate is a fully-entangling gate and the second gate is a partially-entangling gate. In another example, the at least two parallel gates include a fully-entangling $$XX\left(\frac{\pi}{4}\right)$$

gate and a partially-entangling $$XX\left(\frac{\pi}{8}\right)$$

gate.

In another aspect of the method 900, the quantum circuit can be any of the various quantum circuits or simulations described herein, including, for example, a quantum full adder circuit.

In another aspect of the method 900, the at least two parallel gates include a first 2-qubit gate and a second 2-qubit gate, the first gate is implemented using a first pair of ions of the multiple ions in the ion trap and the second gate is implemented using a second pair of ions of the multiple ions in the ion trap, the first pair of ions and the second pair of ions are entangled pairs, and any remaining pairs of ions of multiple ions in the ion trap are not entangled pairs. The ions in the first pair of ions may be located in any two positions in the ion trap, and the ions in the second pair of ions may be located in any two of the remaining positions in the ion trap.

It is to be understood that the method 900 may apply to multiple parallel gates, where each gate is a multi-qubit gate. For example, two or more parallel gates (e.g., 2 parallel gates, 3 parallel gates, 4 parallel gates, etc.) may be implemented where each of the parallel gates is a multi-qubit gate (e.g., 2-qubit gates, 3-qubit gates, 4-qubit gates, etc.).

It is also to be understood that aspects described above in connection with the method 900 may be combined such that two or more of those aspects represent a different implementation supported by this disclosure. For example, two or more aspects of the method 900 may be combined to produce an embodiment associated with the method 900.

Figure 10:
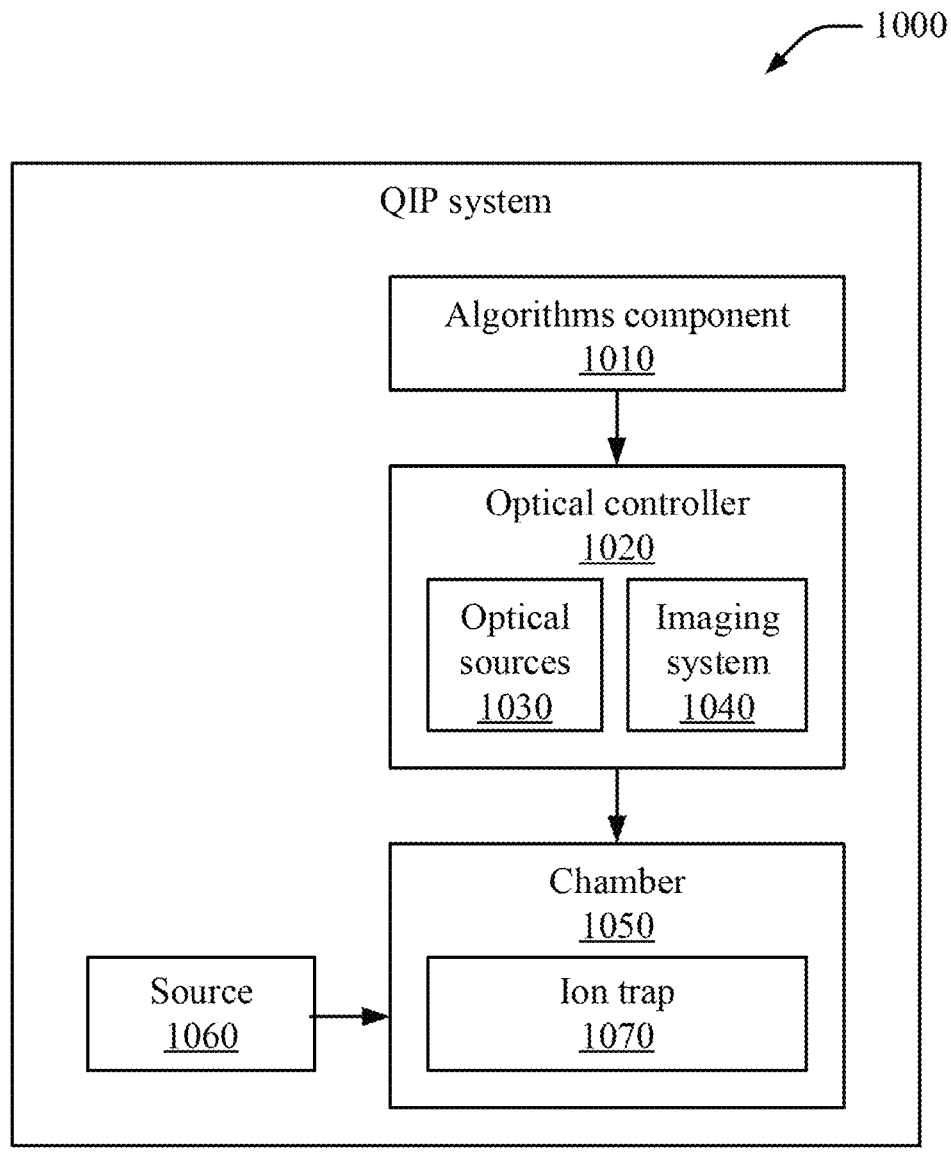
FIG. 10 is a block diagram that illustrates an example of a QIP system in accordance with aspects of this disclosure.

FIG. 10 is a block diagram that illustrates an example of a QIP system 1000 in accordance with aspects of this disclosure. The QIP system 1000 may also be referred to as a quantum computing system, a computer device, or the like. In an aspect, the QIP system 1000 may correspond to portions of a quantum computer implementation of the computer device 800 in FIG. 8.

The QIP system 1000 can include a source 1060 that provides atomic species to a chamber 1050 having an ion trap 1070 that traps the atomic species once ionized by an optical controller 1020. The chamber 1050 may correspond to the vacuum chamber 100 described above in connection with FIG. 1, while the ion trap 1070 may be used to hold a chain of ions such as the chain or linear crystal 110 also described above in connection with FIG. 1. Optical sources 1030 in the optical controller 1020 may include one or more laser sources that can be used for ionization of the atomic species, control (e.g., phase control) of the atomic ions, for fluorescence of the atomic ions that can be monitored and tracked by image processing algorithms operating in an imaging system 1040 in the optical controller 1020, and for generating optical pulse sequences that are used to enable parallel multi-qubit gates and related operations. The imaging system 1040 can include a high resolution imager (e.g., CCD camera) for monitoring the atomic ions while they are being provided to the ion trap 1070 (e.g., for counting) or after they have been provided to the ion trap 1070 (e.g., for monitoring the atomic ions states). In an aspect, the imaging system 1040 can be implemented separate from the optical controller 1020, however, the use of fluorescence to detect, identify, and label atomic ions using image processing algorithms may need to be coordinated with the optical controller 1020.

The QIP system 1000 may also include an algorithms component 1010 that may operate with other parts of the QIP system 1000 (not shown) to implement, perform, and/or execute quantum operations, including quantum circuits, quantum algorithms, and quantum simulations as described above. As such, the algorithms component 1010 may provide instructions to various components of the QIP system 1000 (e.g., to the optical controller 1020) to enable the implementation, performance, and/or execution of the quantum operations, and specifically, for quantum operations that involve parallel multi-qubits gates and related operation.

In an example of the QIP system 1000, which may also be referred to as a trapped-ion quantum system, the algorithms component 1010 may be configured to implement at least two parallel gates of a quantum circuit, each of the at least two parallel gates is a multi-qubit gate, each of the at least two parallel gates is implemented using a different pair of ions of multiple ions in the ion trap 1070, and the multiple ions include four or more ions. In the ion trap 1070, operations on the at least two parallel gates are simultaneously performed as part of the quantum operations.

Moreover, the algorithms component 1010 is further configured to provide instructions to the optical controller 1020 for the optical controller 1020 to generate, based on the instructions, optical pulse sequences that are applied to the different pairs of ions to construct the at least two parallel gates. The optical controller 1020 is further configured to retrieve, based on the instructions, stored information to generate the optical pulse sequences. The optical controller 1020 is configured to generate a first pulse sequence to construct a first gate of the at least two parallel gates, the first pulse sequence has multiple segments for the first gate, each segment of the first pulse sequence corresponds to a relative frequency during that segment of the first gate, and the segments of the first pulse sequence are of equal duration; and to generate a second pulse sequence to construct a second gate of the at least two parallel gates, the second pulse sequence has multiple segments for the second gate, each segment of the second pulse sequence corresponds to a relative frequency during that segment of the second gate, and the segments of the second pulse sequence are of equal duration.

It is to be understood that the examples related to the QIP system 1000 are provided by way of illustration and not of limitations. Features or functions of one component or sub-component of the QIP system 1000 may be combined with other components or sub-components in different implementations or embodiments. In additional, detailed features or functions supported by the QIP system 1000 not expressly associated with a particular component or sub-component may be performed by one of the existing components or sub-components as appropriate. For example, aspects related to quantum circuit and gate selection, implementation, and execution controls may be associated with the algorithms component 1010, aspects related to optical operations may be associated with the optical controller 1020, and aspects related to interaction with trapped ions may be associated with the ion trap 1070.

It is to be understood that the QIP system 1000 may apply to multiple parallel gates, where each gate is a multi-qubit gate. For example, two or more parallel gates (e.g., 2 parallel gates, 3 parallel gates, 4 parallel gates, etc.) may be implemented where each of the parallel gates is a multi-qubit gate (e.g., 2-qubit gates, 3-qubit gates, 4-qubit gates, etc.).

It is also to be understood that aspects described above in connection with the QIP system 1000 may be combined such that two or more of those aspects represent a different implementation supported by this disclosure. For example, two or more aspects of the QIP system 1000 may be combined to produce an embodiment associated with the QIP system 1000.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. A method of performing quantum operations in a trapped-ion quantum system, comprising:
   implementing two parallel gates of a quantum circuit, each of the two parallel gates being a multi-qubit gate, each of the two parallel gates being implemented using a different set of ions of a plurality of ions in an ion trap, the two parallel gates including a first multi-qubit gate implemented using a first set of ions and a second multi-qubit gate implemented using a second set of ions, the first set of ions and the second set of ions being entangled sets and any remaining sets of ions of the plurality of ions in the ion trap are not entangled sets,
   wherein implementing the two parallel gates includes generating a first optical pulse sequence having multiple segments and applying first beams to the first set of ions that are based on the first optical pulse sequence to implement the first multi-qubit gate, and
   wherein implementing the two parallel gates includes generating a second optical pulse sequence having multiple segments and applying second beams to the second set of ions that are based on the second optical pulse sequence to implement the second multi-qubit gate; and
   simultaneously performing operations on the two parallel gates as part of the quantum operations.

2. The method of claim 1, wherein:
   ions in the first set of ions are located in any positions in the ion trap, and
   ions in the second set of ions are located in any remaining positions in the ion trap.

3. The method of claim 1, wherein the generating of the first and second optical pulse sequences includes retrieving stored information to generate the first and second optical pulse sequences.

4. The method of claim 1, wherein the two parallel gates are both XX gates.

5. The method of claim 1, wherein the two parallel gates are both CNOT gates.

6. The method of claim 1, wherein the two parallel gates have different amounts of entanglement.

7. The method of claim 6, wherein:
   the first multi-qubit gate is a fully-entangling gate and the second multi-qubit gate is a partially-entangling gate.

8. The method of claim 6, wherein the two parallel gates include a fully-entangling $$XX\left(\frac{\pi}{4}\right)$$

gate and a partially-entangling $$XX\left(\frac{\pi}{8}\right)$$

gate.

9. The method of claim 1, wherein the quantum circuit is a quantum full adder circuit.

10. A trapped-ion quantum information processing (QIP) system configured to perform quantum operations, comprising:
    an algorithms component configured to implement two parallel gates of a quantum circuit, each of the two parallel gates being a multi-qubit gate, each of the two parallel gates being implemented using a different set of ions of a plurality of ions in an ion trap, the two parallel gates including a first multi-qubit gate implemented using a first set of ions and a second multi-qubit gate implemented using a second set of ions, the first set of ions and the second set of ions being entangled sets and any remaining sets of ions of the plurality of ions in the ion trap are not entangled sets;
    an optical controller, wherein the algorithms component is configured to provide instructions to the optical controller and the optical controller is configured to generate, based on the instructions, a first optical pulse sequence having multiple segments and applying first beams to the first set of ions that are based on the first optical pulse sequence to implement the first multi-qubit gate,
    wherein the optical controller is further configured to generate, based on the instructions, a second optical pulse sequence having multiple segments and applying second beams to the second set of ions that are based on the second optical pulse sequence to implement the second multi-qubit gate; and
    wherein operations on the two parallel gates are simultaneously performed as part of the quantum operations.

11. The trapped-ion QIP system of claim 10, wherein:
    ions in the first set of ions are located in any positions in the ion trap, and
    ions in the second set of ions are located in any remaining positions in the ion trap.

12. The trapped-ion QIP system of claim 10, wherein the optical controller is further configured to generate the first and second optical pulse sequences by retrieving, based on the instructions, stored information to generate the first and second optical pulse sequences.

13. The trapped-ion QIP system of claim 10, wherein the two parallel gates are both XX gates.

14. The trapped-ion QIP system of claim 10, wherein the two parallel gates are both CNOT gates.

15. The trapped-ion QIP system of claim 10, wherein the two parallel gates have different amounts of entanglement.

16. The trapped-ion QIP system of claim 15, wherein:
    the first multi-qubit gate is a fully-entangling gate and the second multi-qubit gate is a partially-entangling gate.

17. The trapped-ion QIP system of claim 15, wherein the two parallel gates include a fully-entangling $XX\left(\frac{\pi}{4}\right)$ gate and a partially-entangling $XX\left(\frac{\pi}{8}\right)$ gate.

18. The trapped-ion QIP system of claim 10, wherein the quantum circuit is a quantum full adder circuit.

19. A computer-readable storage medium storing code with instructions executable by a processor for performing quantum operations in a trapped-ion quantum information processing (QIP) system, comprising:

code for implementing two parallel gates of a quantum circuit, each of the two parallel gates being a multi-qubit gate, each of the two parallel gates being implemented using a different set of ions of a plurality of ions in an ion trap, the two parallel gates including a first multi-qubit gate implemented using a first set of ions and a second multi-qubit gate implemented using a second set of ions, the first set of ions and the second set of ions being entangled sets and any remaining sets of ions of the plurality of ions in the ion trap are not entangled sets, wherein the code for implementing the two parallel gates includes code for generating a first optical pulse sequence having multiple segments and for applying, to the first set of ions, first beams based on the first optical pulse sequence to implement the first multi-qubit gate;

wherein the code for implementing the two parallel gates includes code for generating a second optical pulse sequence having multiple segments and for applying, to the second set of ions, second beams based on the second optical pulse sequence to implement the second multi-qubit gate; and code for performing operations on the two parallel gates simultaneously as part of the quantum operations.

20. The computer-readable storage medium of claim 19, wherein:

ions in the first set of ions are located in any positions in the ion trap, and ions in the second set of ions are location in any of the remaining positions in the ion trap.

\* \* \* \* \*